United States Patent
Kretz et al.

(10) Patent No.: US 9,318,152 B2
(45) Date of Patent: Apr. 19, 2016

(54) SUPER SHARE

(75) Inventors: Martin H. Kretz, Lund (SE); Tom Gajdos, Dalby (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 1412 days.

(21) Appl. No.: 11/551,312

(22) Filed: Oct. 20, 2006

(65) Prior Publication Data

US 2008/0109852 A1 May 8, 2008

(51) Int. Cl.
| | |
|---|---|
| *G06F 15/16* | (2006.01) |
| *G11B 27/11* | (2006.01) |
| *G11B 27/00* | (2006.01) |
| *G11B 27/10* | (2006.01) |
| *G11B 27/32* | (2006.01) |
| *H04L 29/08* | (2006.01) |

(52) U.S. Cl.
CPC .............. *G11B 27/11* (2013.01); *G11B 27/002* (2013.01); *G11B 27/105* (2013.01); *G11B 27/322* (2013.01); *H04L 67/04* (2013.01); *H04L 67/14* (2013.01); *H04L 67/148* (2013.01); *G11B 2220/412* (2013.01)

(58) Field of Classification Search
CPC .............................................. H04L 2012/2841
USPC ........................................................ 709/204
See application file for complete search history.

(56) References Cited

U.S. PATENT DOCUMENTS

| | | | |
|---|---|---|---|
| 6,226,672 B1 * | 5/2001 | DeMartin et al. ............. | 709/219 |
| 6,941,324 B2 * | 9/2005 | Plastina et al. | |
| 7,599,685 B2 * | 10/2009 | Goldberg et al. ............. | 455/421 |
| 7,668,964 B2 * | 2/2010 | Millington .................... | 709/231 |
| 7,742,740 B2 * | 6/2010 | Goldberg et al. ............ | 455/11.1 |
| 2002/0168938 A1 * | 11/2002 | Chang ............................ | 455/41 |
| 2002/0174243 A1 * | 11/2002 | Spurgat et al. ................ | 709/231 |
| 2003/0126211 A1 * | 7/2003 | Anttila et al. ................. | 709/205 |
| 2003/0182315 A1 * | 9/2003 | Plastina et al. ................ | 707/200 |
| 2004/0003090 A1 | 1/2004 | Deeds | |
| 2004/0117442 A1 | 6/2004 | Thielen | |
| 2005/0240494 A1 * | 10/2005 | Cue et al. ........................ | 705/27 |
| 2005/0251807 A1 * | 11/2005 | Weel ............................. | 719/310 |
| 2006/0143236 A1 * | 6/2006 | Wu ............................ | 707/104.1 |
| 2006/0221173 A1 * | 10/2006 | Duncan ...................... | 348/14.02 |

(Continued)

FOREIGN PATENT DOCUMENTS

| | | |
|---|---|---|
| CN | 1956054 A | 5/2007 |
| JP | 2005-056343 | 3/2005 |

(Continued)

OTHER PUBLICATIONS

Written Opinion for International Application No. PCT/IB2007/001040 dated Sep. 18, 2007.

(Continued)

*Primary Examiner* — Hamza Algibhah

(74) *Attorney, Agent, or Firm* — Renner, Otto, Boisselle & Sklar, LLP.

(57) ABSTRACT

A method and apparatus for sharing media content between electronic equipment includes transferring session data from a first electronic equipment to a second electronic equipment, said session data including a queue of media content executing or executable on the first electronic equipment, and transferring media content identified in the session data to the second electronic equipment.

21 Claims, 5 Drawing Sheets

(56) References Cited

U.S. PATENT DOCUMENTS

| | | | |
|---|---|---|---|
| 2006/0265349 A1* | 11/2006 | Hicken | 707/1 |
| 2007/0038999 A1* | 2/2007 | Millington | 718/100 |
| 2007/0073725 A1* | 3/2007 | Klein et al. | 707/10 |
| 2007/0073727 A1* | 3/2007 | Klein et al. | 707/10 |
| 2007/0153740 A1* | 7/2007 | Chang et al. | 370/331 |
| 2007/0161402 A1* | 7/2007 | Ng et al. | 455/554.2 |
| 2007/0168388 A1* | 7/2007 | Plastina et al. | 707/104.1 |
| 2007/0186003 A1* | 8/2007 | Foster et al. | 709/231 |
| 2007/0214229 A1* | 9/2007 | Millington et al. | 709/208 |
| 2007/0245882 A1* | 10/2007 | Odenwald | 84/609 |
| 2007/0299874 A1* | 12/2007 | Neumann et al. | 707/104.1 |
| 2007/0299978 A1* | 12/2007 | Neumann et al. | 709/229 |
| 2009/0222392 A1* | 9/2009 | Martin et al. | 706/46 |

FOREIGN PATENT DOCUMENTS

| | | |
|---|---|---|
| WO | 03/098409 | 11/2003 |
| WO | 2005/045704 | 5/2005 |

OTHER PUBLICATIONS

International Preliminary Report on Patentability for International Application No. PCT/IB2007/001040 dated Jan. 22, 2009.

* cited by examiner

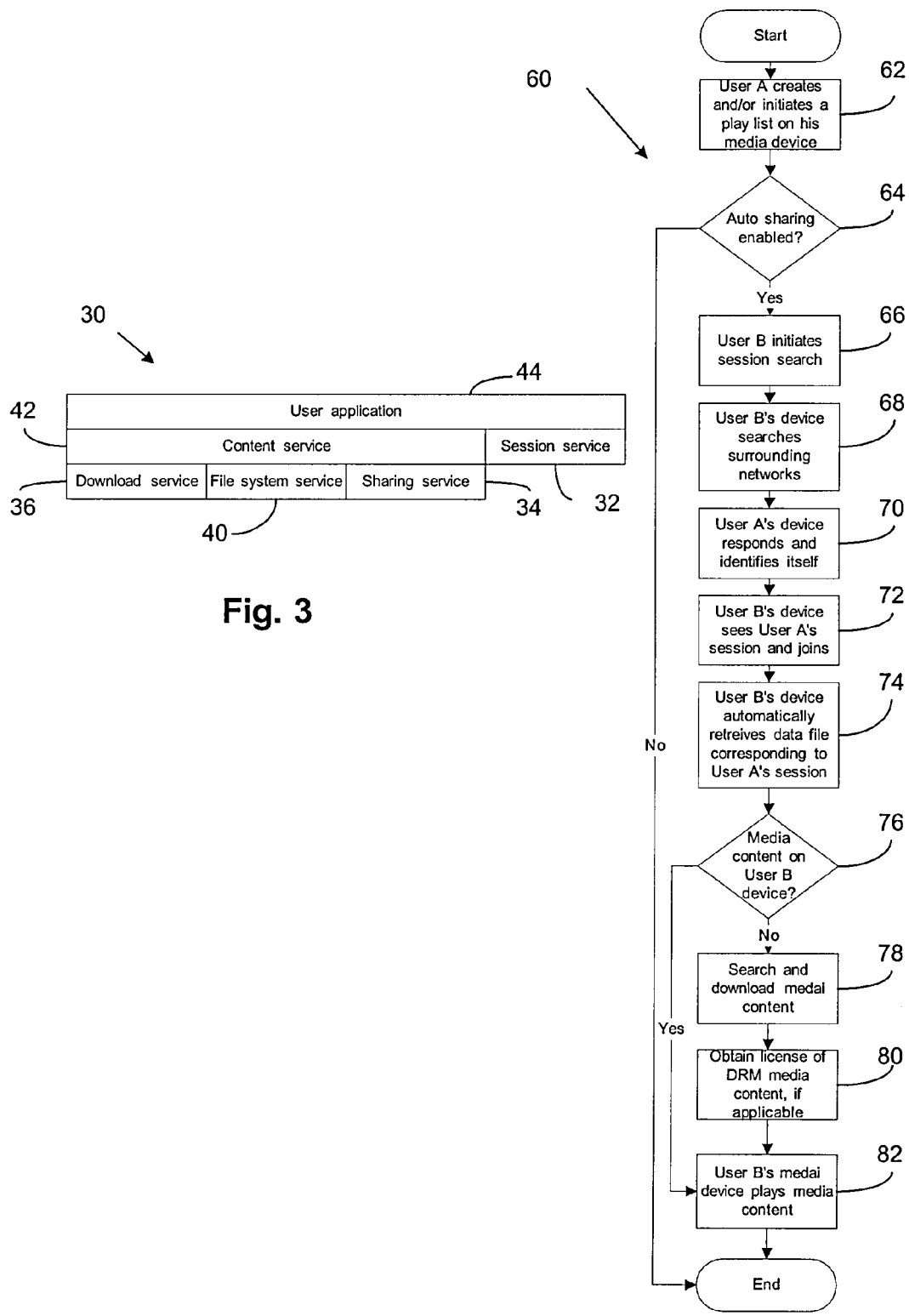

SUPER SHARE

TECHNICAL FIELD OF THE INVENTION

The present invention relates generally to electronic equipment and, more particularly, to a apparatus and method for sharing content between electronic equipment, such as mobile phones or the like.

DESCRIPTION OF THE RELATED ART

Traditionally, media content, such as audio (e.g., music and/or spoken words) and video (e.g., moving images, movies, etc., with or without audio) have been distributed via conventional mediums such as audio and video tape, records, compact discs (CDs), Digital Versatile Disks (DVDs), or the like. While such mediums have satisfactorily served their purpose, they have some draw backs. For example, in order to listen to or watch the media content, an individual must first obtain the medium that contains the media content. This can make sharing of media content difficult, as it requires that the physical medium be in hand and/or exchanged between each of the sharing parties.

Presently, high speed communication networks between electronic equipment (e.g., via an internet connection or a short range radio connection) enable media content to be shared between electronic equipment. This is advantageous, for example, in that media content can be obtained anywhere that an internet or short range network connection is available. Further, since the media content is in electronic form, a physical medium is not needed in order to play the media content.

While high speed connectivity provides numerous advantages when buying or sharing media content, new and previously unconsidered issues are introduced. For example, since the pool of media content available on the internet is extremely large, one now must sift through this large pool to find media content that suits their taste. This may not be a problem if the individual knows what they are looking for. However, if the individual would like to find new media content that suits their personal preferences, it is likely that they must view and/or listen to various content that may be unappealing to them.

SUMMARY

Sharing media content between friends can be a tedious task. For example, present sharing methods involve sending one or more files from a first electronic equipment to a second electronic equipment. This requires that the electronic equipment that has the source file be manipulated by a user to send the source file to a receiving electronic equipment. This can include manually locating another device, establishing a connection, sending the file, and then selecting an application to play the media content.

The present invention enables users of electronic equipment to share a media experience. In its simplest form, this may be sharing a single file. In other forms, the experience can include part or all of a play list, a slide show, a game, a radio program, a television program, etc.

For example, a user of a first electronic equipment may have created a play list that includes a number of songs in a particular order (e.g., wherein the order adds to the experience). The first user may wish to share the experience created by the play list with a friend. Conventionally, this may be accomplished by sharing the headset of the first electronic equipment such that both parties can listen to the songs at the same time, or by sending all the songs to the second user, who then would have to duplicate the play list of the songs so as to match that of the first user.

The present invention provides a method and apparatus that enables first and second electronic equipment to automatically establish a communication link and transfer session data, such as the play list, from the first electronic equipment to the second electronic equipment. Then, the second electronic equipment can proceed to obtain the media content as specified in the play list (either from the first electronic equipment or from some other location).

Further, the sharing as described herein supports digital rights management (DRM) and, therefore, is compatible with both copyrighted media content and non-copyrighted media content. Thus, the invention can increase revenue for owners of media content, as it encourages file sharing yet provides a means of compensation for owners of the media content.

According to one aspect of the invention, there is provided a method of sharing media content using electronic equipment, including transferring session data from a first electronic equipment to a second electronic equipment, said session data including a queue of media content executing or executable on the first electronic equipment, and transferring media content identified in the session data to the second electronic equipment.

According to one aspect of the invention, the session data is a list that identifies media content to be executed on the first and/or second electronic equipment.

According to one aspect of the invention, the media content includes at least one of an audio file, a video file, an image file or a text file.

According to one aspect of the invention, the media content includes a combination of at least two of an audio file, a video file, an image file or a text file.

According to one aspect of the invention, transferring media content includes transferring media content from the first electronic equipment to the second electronic equipment.

According to one aspect of the invention, transferring media content includes transferring media content from a server to the second electronic equipment.

According to one aspect of the invention, transferring media content includes automatically identifying a secondary source for the media content when a communication link with the first electronic equipment is terminated.

According to one aspect, automatically transferring media content includes identifying multiple sources that include the media content and transferring the media content from the multiple sources to the second electronic equipment.

According to one aspect of the invention, transferring media content includes using at least one of an 802.11x based protocol or a Bluetooth protocol to implement the transfer.

According to one aspect of the invention, the method further includes providing restrictions on obtaining the session data.

According to one aspect of the invention, the method further includes executing the media content on the second electronic equipment.

According to one aspect of the invention, the method further includes obtaining rights to execute the media content on the electronic equipment.

According to one aspect of the invention, automatically transferring includes transferring from a plurality of electronic equipment to the second electronic equipment.

According to one aspect of the invention, there is provided a method of sharing media content using electronic equipment, including establishing a communication session between a first electronic equipment and a second electronic equipment, transferring session data from the first electronic equipment to the second electronic equipment, said session data indicative of media content executing or queued to execute on the first media content, and transferring media content identified in the session data to the second electronic equipment.

According to one aspect of the invention, the method further includes executing the media content on the second electronic equipment.

According to one aspect of the invention, executing includes synchronizing the media content between the first and second electronic equipment such that actions taken on the first electronic equipment are mimicked on the second electronic equipment.

According to one aspect of the invention, the actions are at least one of a play, pause, stop, skip, index forward, or an index reverse command.

According to one aspect of the invention, the actions are at least one of changing an order of media content in the session data, deleting media content in the session data, or adding media content to the session data.

According to one aspect of the invention, executing includes synchronizing the media content between the first and second electronic equipment such that the media content executes substantially simultaneously on the respective electronic equipment.

According to one aspect of the invention, the session data includes an index or pointer that identifies a current location within the media content to execute.

According to one aspect of the invention, establishing a communication link includes uniquely identifying the first and/or second electronic equipment.

According to one aspect of the invention, uniquely identifying includes identifying the first and/or second electronic equipment via a user settable password or identification number.

According to one aspect of the invention, establishing a communication link includes using rules within a communication protocol to determine if the communication link may be established.

According to one aspect of the invention, transferring media content includes transferring media content in the background while previously transferred media content is executed.

According to one aspect of the invention, transferring media content includes transferring media content in the background while previously transferred media content is executed.

According to one aspect of the invention, the session data is at least one of a play list, library, or location identifier of the media content.

According to one aspect of the invention, there is provided an electronic equipment for sharing media content, including a communication device operative to establish a wireless communications with other electronic equipment, and a sharing circuit including a session service, a sharing service and a download service, wherein said session service is operative to utilize the communication device to search and find other electronic equipment that can push and/or pull a session to/from the electronic equipment, said session including session data indicative of media content executing or queued to execute on the other electronic equipment.

According to one aspect of the invention, the sharing service is operative to identify media content as specified in the session data on other electronic equipment, said identification based on a characteristic of the media content.

According to one aspect of the invention, the download service, under the direction of the sharing service, is operative to control and/or manage transfer of media content to/from the electronic equipment.

According to one aspect of the invention, the electronic equipment is a mobile phone.

According to one aspect of the invention, there is provide a computer program embodied in a computer readable medium for sharing media content between electronic equipment, including code that establishes a communication session between a first electronic equipment and a second electronic equipment, code that transfers session data from the first electronic equipment to the second electronic equipment, said session data indicative of media content queued to execute on the first electronic equipment, and code that transfers media content identified in the session data to the second electronic equipment.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIG. 3 is a block diagram illustrating exemplary services of a media share apparatus in accordance with the invention.

FIG. 4 is a flow chart illustrating exemplary steps encountered in performing a media share in accordance with the invention.

DETAILED DESCRIPTION OF EMBODIMENTS

Figure 1A:
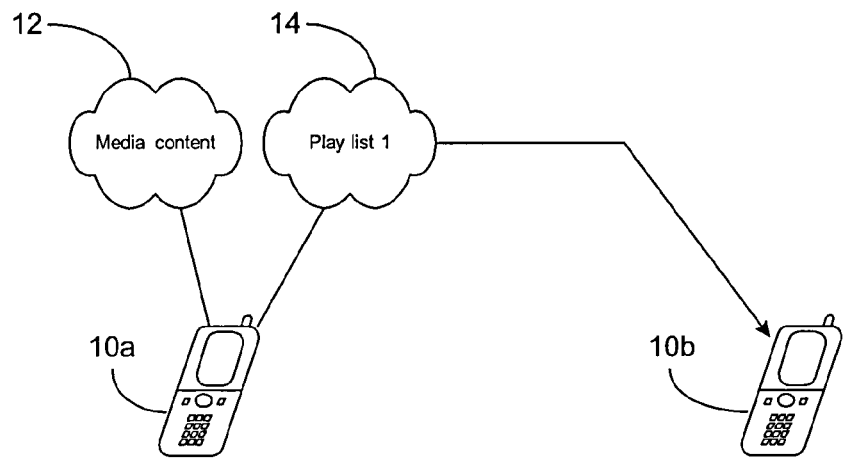
FIGS. 1A-1B illustrate an exemplary media share in accordance with the invention.

The present invention will now be described with reference to the drawings, wherein like reference numerals are used to refer to like elements throughout.

The term "electronic equipment" includes portable radio communication equipment. The term "portable radio communication equipment," which herein after is referred to as a "mobile radio terminal," "mobile phone," "mobile device," or "mobile terminal", and the like, includes all equipment such as mobile telephones, pagers, communicators, i.e., electronic organizers, personal digital assistants (PDAs), smartphones, portable communication apparatus or the like. The term "electronic equipment" also may include portable digital music and/or video devices, e.g., ipod devices, mp3 players, portable game systems, portable television devices, home theater PC (HTPC) systems, etc.

In the present application, the invention is described primarily in the context of a mobile phone. However, it will be appreciated that the invention is not intended to be limited to a mobile phone and can be any type of electronic equipment.

Conventional electronic equipment, such as mobile phones, for example, have the ability to play or otherwise execute various types of media content. As used herein, media content includes audio content (e.g., music and/or speech utilizing various formats including mp3, wmv, etc.), video content (e.g., movies using no compression or various compression techniques such as mpeg, divx, etc.), textual content (e.g., text-based files), image content (e.g., pictures or other images using various formats such as jpg, gif, tiff, etc.), and executable code (e.g., computer programs). Further, media content is not restricted to any particular file format, and can include any file format.

Additionally, the term "execute" (or forms thereof including executing and executable), in addition to carrying out or performing instructions (e.g., executing a computer program or the like), is to be construed to include playing media content (e.g., playing an mp3 audio file, to play an mp3 audio file, playable mp3 file), viewing media content (e.g., viewing an mpeg video file, to view an mpeg video file, viewable mpeg video file), downloading media content (e.g., to download media content), or otherwise using media content. The terms execute, play, view, download (or forms thereof) may be used interchangeably herein.

Often, two or more individuals may wish to share media content between their mobile phones. Presently, this can be accomplished through a number of steps, including locating the file or files to be shared, manually locating the receiving device, establishing a connection between the two devices, sending the file from the source device to the receiving device, and then playing the media content on the receiving device. As is evident, this can be a tedious task that may intimidate the average mobile phone user and, thus, stifle file sharing. Moreover, while media content may be manually shared, often the experience of the original presentation is lost or never fully realized.

The present invention enables two or more users not only to easily share media content, but to share an experience. For example, a first user may have a music play list created on their mobile phone, wherein the order of the songs may be part of the experience. The first user, via his mobile phone, may wish to share the play list and media content with a second user (e.g., a friend). The first user may send a message to the second user (e.g., a text message, email, or the like) inviting the second user to experience the media content in the play list. The second user can choose to accept the share (e.g., by responding to the message or to a particular link in the message), and then the second mobile phone automatically retrieves the media content specified in the play list. Alternatively, the messaging may include an IP address of the first user's mobile phone. Then, the second user's mobile phone can parse out the IP address and establish a communication link with the first user's mobile phone (e.g., via an internet connection or an ad hoc wireless connection).

Figure 1B:
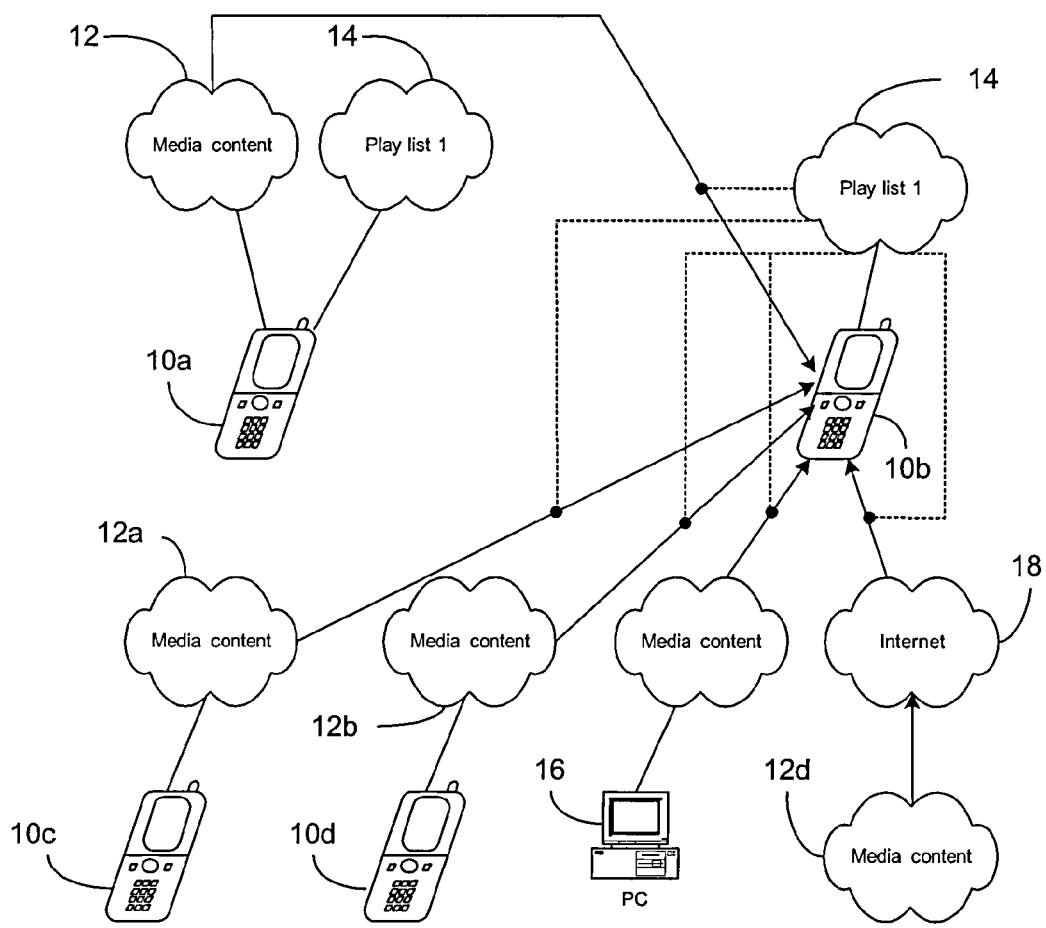

For example, and with reference to FIGS. 1A and 1B, a first mobile phone 10*a* includes media content 12, and a data file or session data 14, such as a play list or the like, that specifies at least a portion of the media content 12 to be executed (e.g. a queue containing media content to be executed). It is noted that although the session data 14 is primarily described as a file, it may take other forms. For example, the session data 14 may be sent to the receiving device (e.g., the second mobile phone 10*b*) in any form over any protocol over any medium. One representation may be a SOAP object that, in the case of an audio file or play list, holds the data, which can include a sorted list of unique identifiers for the files, their current state (e.g., play file X, paused, stopped, etc.).

A user of the first mobile phone 10*a* then invites a user of a second mobile phone 10*b* to share the media content. The second user accepts the invite, and the first and second mobile phones automatically establish a communication link (e.g., via any link that can use internet protocols, including WIFI, Bluetooth, etc.), and the first mobile phone 10*a* sends the session data 14 to the second mobile phone 10*b*. The session data 14 can include, for example, a listing of songs to be played, a listing of pictures to be displayed, a frequency of a particular radio or television station, a location of files to be executed, etc. In the case of copyrighted media content, the session data 14 may include a source or link to where the media content and/or rights to execute the media content may be purchased.

Once the session data 14 has been received by the second mobile phone 10*b*, the second mobile phone 10*b* proceeds to obtain the media content described in the session data 14. For example, the media content 12 may be transferred from the first mobile phone 10*a* to the second mobile phone 10*b* via a short range communication link (e.g., Bluetooth, etc.), a WIFI connection (e.g., a communication link based on the 802.11x standard), UMTS or via other long range communication protocols (e.g., Wimax), etc. If the connection between the first and second mobile phones 10*a*, 10*b* is interrupted before the media content is completely transferred, or if the media content does not reside on the first mobile phone 10*a*, the second mobile phone 10*b* may search for other sources of the media content 12.

For example, the second mobile phone 10*b* may search for the media content 12 on other devices, such as other mobile phones 10*c*, 10*d*, on personal computers 16 (e.g., a lap top or desk top PC), or on the internet 18, each of which may have media content 12*a*-12*d* that contains part of the media content specified in the session data 14. The search and/or identification of the media content may be via conventional methods using, for example, identifiers within the media content that uniquely identify the media content. Additionally, the media content may be transferred serially (e.g., each file is sequentially transferred from one mobile phone to another) or in parallel (e.g., multiple files are transferred substantially simultaneously from multiple mobile phones to a single mobile phone). Parallel transfer is advantageous in that it can reduce the time transfer time of the media content. The transfers also may be separated based on a session type (e.g., music sessions may be transferred separate from chat sessions).

The media content may be executed on the second mobile phone 10b even though all of the media content has not been transferred to the second mobile phone 10b. The second mobile phone 10b may continue to search and/or download media content in the back ground while media content 12 already transferred is executed. Preferably, the execution of media content is not interrupted by non-executable items (e.g., items not fully downloaded, missing, locked due to DRM, missing codecs, incompatible hardware, or otherwise not executable). Further, while a particular media content may not be executable on a particular mobile phone, it is preferable that the media content remain in the play list as it may be executable in other electronic equipment (e.g., during subsequent transfers to other electronic equipment).

In the event of missing codec the mobile phone may search or otherwise locate the correct codec and proceed to download the codec. Thus, although the particular media content may not be initially executable, it may be executed at a later time.

While the example of FIGS. 1A-1B illustrates the media content 12 residing on the first mobile phone 10a, the media content 12 may reside at other locations. For example, the media content 12 and/or the session data 14 may reside on a streaming server. Locating the session data 14 on a server may be preferable for certain individuals (e.g., celebrities) who wish to share their session, as users obtaining the session data will connect to the server, as opposed to the person's mobile phone, for example. Additionally, instead of transferring all media content 12 in the session data 14, the transfer may correspond to the media content queued to execute on the first mobile phone 10a. For example, if the session data (e.g., play list) on the first mobile phone 10a includes twenty songs, and the user of the first mobile phone 10a has already listened to seven songs before sending the invite, then the session data 14 transferred to the second mobile phone 10b may include only the unplayed songs (e.g., the remaining thirteen songs of the play list). In this scenario, the second mobile phone 10b effectively is joining the session of the first mobile phone 10a, wherein the session is already in progress.

Additionally, instead of the user of the first mobile phone 10a inviting the user of the second mobile phone 10b, the second mobile phone 10b may search for available sessions, without actually being invited to join the session. For example, the first mobile phone 10a may be configured for automatic sharing, wherein any mobile phone within range of the first mobile phone 10a can detect and transfer the media content 12 and/or session data 14.

Further, sessions may be synchronized such that when the originator of the session is executing media content from a play list, for example, and selects a skip function so as to jump over the next media content in the queue, then those parties that have joined the session also will skip the next media content in the queue. In this scenario, only the sync data (e.g., current song played and the present location within that song) is transferred between clients, as the media content itself can reside on each mobile phone 10a, 10b or can be streamed from a remote source.

Synchronization may be enabled for playback of media content as well as for session changes. For example, if the second mobile phone 10b is synchronized to the first mobile phone's session, and the session on the first mobile phone 10a is changed (e.g., media content is rearranged, deleted, added, etc.), then those changes also may be reflected on the second mobile phone 10b. Should communications between the respective mobile phones be lost (e.g., the devices are not within range of one another as may be the case for Bluetooth or WIFI), synchronization control may be inhibited and the sessions are effectively on their own or otherwise independent. Should communications between the respective mobile phones be reestablished at a later time, then synchronization can be reestablished. Further, if a third mobile phone joins and is synchronized to the session on the second mobile phone 10b, the third mobile phone is effectively synchronized to the first mobile phone 10a.

Alternatively, if short range communications are lost (e.g., because devices are no longer within range of one another), communications may be automatically established via a long range link. In this manner, synchronization between devices may be maintained. For example, communications may be transferred from WIFI to UMTS when the WIFI communication link becomes weak or is lost. Once the WIFI communication link is reestablished, communications may be transferred back to WIFI.

Figure 2A:
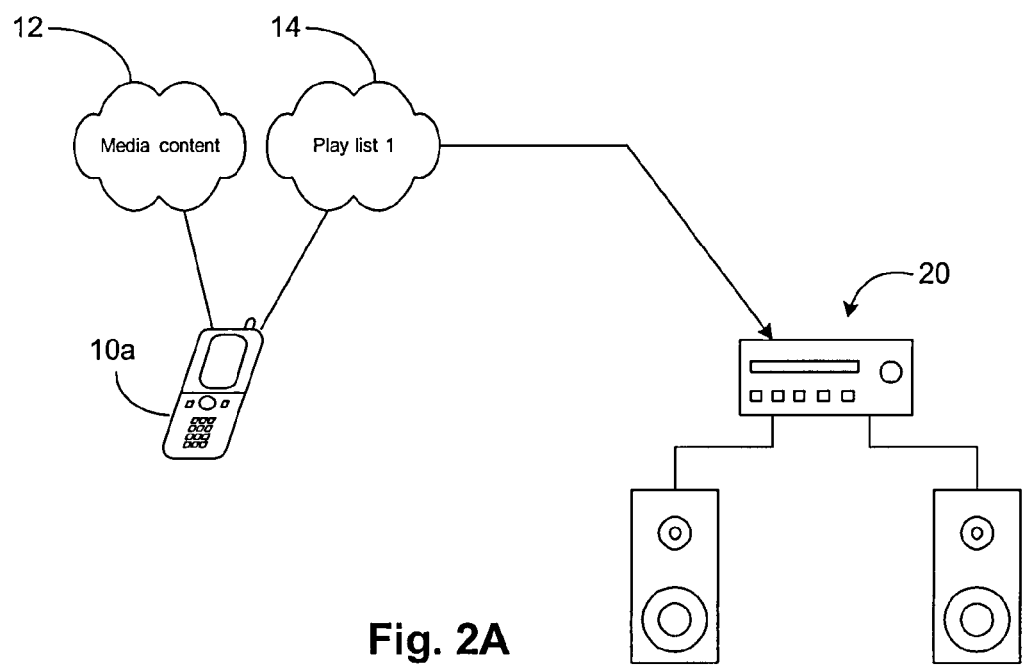
FIGS. 2A-2B illustrate another exemplary media share in accordance with the invention.
Figure 2B:
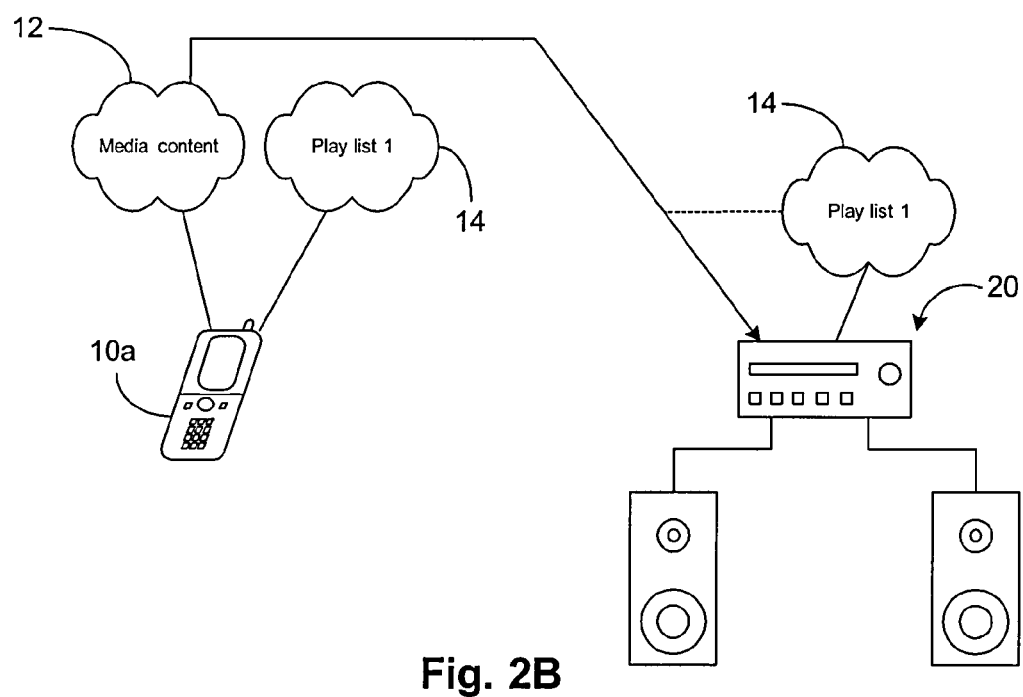

FIGS. 2A-2B illustrate another example of sharing media, wherein a user may be playing media content 12 with a predefined play list 14 on mobile phone 10a. When the user arrives at home, he wishes to continue playing the media content 12 on his home stereo system 20 (e.g., a home theater pc (HTPC) sound system or the like), which may have superior decoding capabilities relative to the mobile phone 10a. Thus, it is preferable to utilize the stereo system's decoder, instead of the mobile phone's decoder. In other words, it is preferable to transfer the session data and/or media content to the home stereo 20, as opposed to simply streaming the media content from the phone 10a to the home stereo. Further, the user may wish to continue playing the media content on the home stereo system 20 from its present point on the mobile phone 10a. In this scenario, the mobile phone 10a may push the session to the home stereo 20, wherein the session data 14 including an index pointer are transferred from the mobile phone 10a to the home stereo 20. The index pointer can indicate a current song and/or current location within a song. When the stereo system 20 receives the information, it can proceed in a manner consistent with mobile phone 10b described above in FIGS. 1A-1B The mobile phone 10a may be configured to search (e.g., continuously or at predefined intervals) for devices that can receive a session. When a device is detected, the mobile phone 10a can push the session to the device, and then the device can execute the media content 12. In other words, the mobile phone 10a can automatically send the session data 14 and a pointer indicating the present location of the session, or it can send session data 14 that includes only the unexecuted media content 12. If the media content does not exist on the device (e.g., the stereo 20), then the media content 12 can be transferred in the background (e.g., from the mobile phone 10a to the stereo while the media content 12 is being executed.). As will be appreciated, the stereo system 20 may be coupled to the internet 18 and thus have the capability of searching for media content in the event the connection with the mobile phone 10a is lost or the mobile phone 10a does not include all of the media content 12. Alternatively, the stereo system 20 may perform the search for available devices, as opposed to the mobile phone 10a performing the search.

Moving now to FIG. 3, there are shown exemplary layered interaction between services 30 within the electronic equipment for implementing media content sharing. The services include a session service 32, a sharing service 34, a download service 36, a file system service 40, and a content service 42. Also shown is the user application software level 44, such as a media player of the electronic equipment, for example.

The session service 32 can find and/or provide session information to/from other electronic equipment. For example, the session service can search and find ongoing sessions that may be pulled on another device, and/or find other devices in which a session may be pushed. Finding other devices and discovering if a push or pull of a session can be performed may be accomplished using UPnP service discovery functionality. This service allows devices to broadcast and respond to queries in an IP (internet protocol) network, so as to indicate whether or not certain services are supported. A session sharing service can be built on top of the UPnP service to enable sessions to be sent and received.

For example, an environment discovery stack can be included in the mobile phone 10a, wherein the environment discovery stack can include several well-tested protocols, such as Simple Service Description Protocol (SSDP), Simple Object Access Protocol (SOAP), General Event Notification Architecture (GENA), HTTP, TCP/IP and Bonjour. As is known in the art, an environment discovery stack is an architecture for pervasive peer-to-peer network connectivity of intelligent appliances, wireless devices, and PCs of all form factors. It is designed to bring easy-to-use, flexible, standards-based connectivity to ad-hoc or unmanaged networks whether in the home, in a small business, public spaces, or attached to the Internet. The environment discovery stack is a distributed, open networking architecture that leverages TCP/IP and Web technologies to enable seamless proximity networking in addition to control and data transfer among networked devices in the home, office, and public spaces.

The environment discovery stack can be designed to support zero-configuration, "invisible" networking, and automatic discovery for a breadth of device categories. A device can dynamically join a network, obtain an IP address, convey its capabilities, and learn about the presence and capabilities of other devices. Finally, a device can leave a network smoothly and automatically without leaving any unwanted state behind.

The sharing service 34 enables sharing of files between devices, wherein a file can be uniquely identified, even if the file name has changed and if it resides on many different devices. This technique is used in many file sharing applications and is well known in the art, an example of which is known as the TTH hash algorithm, wherein files are hashed and then located by their hashes. Typically, hashing is performed on media content embodied as files (e.g., music and/or movie files). With respect to games, radio and television programs, for example, data corresponding to these types of media content may be stored in some other format within the session data (e.g., the actual frequency of the radio or television station). Thus, the sharing service 34 also supports sending a unique link to a resource. Normally, this link will be a file, but can include other things, such as a game session, a radio channel, a chat or messaging session, etc.

The download service 36 provides a means for controlling and managing downloads, as well as selecting the appropriate network to download files. Preferably, the download service 36 determines whether or not to download over certain networks (e.g., download a file via WIFI, but not GPRS). For example, the download service 36 may be configured to only utilize WIFI or Bluetooth connections, thereby minimizing air time charges associated with using a cellular phone network. Alternatively, the download service 36 may be configured to utilize cellular phone networks only when no other option is available. Further, the download service may provide default locations for file storage and/or file transfer, and provide limitations on the actual download operation e.g., based on the type of files that may be transferred. The limitations may be based on the file content, copy protection (if present), file size, etc.).

The content service 42 and file system service 40 provide functionality for determining if media content 12 is on the electronic equipment and, if so, providing that media content 12 to other applications. For example, the content service 42 monitors and manages media content 12 on the electronic equipment. If a user application 44 asks for a particular media content 12, the content service 42 will know if the media content 12 is on the electronic equipment. If the media content 12 is on the electronic equipment, the content service 42 along with the file service 40 will provide the media content 12 to the user application 44 or otherwise provide information pertaining to a location of the media content 12 on the electronic equipment. If it is not present, then the content service 42 will provide a message or other indication that the media content 12 is not on the electronic equipment.

Utilizing one or more of the services 30, sharing of media content between electronic equipment can be accomplished in a relatively simple manner. For example, the session service 32 can identify electronic equipment within a range of a particular communication medium (e.g., Bluetooth, 802.11x, etc.), establish a communication link with the electronic equipment, and determine if the electronic equipment supports media sharing. If the electronic equipment does not support media sharing, then the session service may continue to search for other devices.

If the session service 32 identifies electronic equipment that does support sharing, then the session service 32 and/or the sharing service 34 may push or pull the session data 14 to/from the electronic equipment, such as a mobile phone, server, etc.

Further, the sharing service 34 may identify files on the electronic equipment that may be shared. This can include uniquely identifying files specified in the session data 14. For example, it is common for a file to have its name changed, even thought the data within the file remains substantially unchanged. The sharing service 34 can analyze media content on other devices and/or on the internet to determine if the particular media content is specified in the session data 14, even if characteristics of the file have been altered. This identification process can be accomplished using the TTH hash algorithm, for example.

Once the files have been identified, the download service 34 proceeds to download (or upload) the media content 12. This includes determining which network is best suited to perform the transfer (e.g., Bluetooth, WIFI, cellular, etc.), as well as where to store and/or send the media content. Details regarding actual file storage and management can be handled by the content service 42 and file system service 40. The download service 36, under the direction of the sharing service 34, also may be responsible for obtaining licenses for copyrighted media content. As will be appreciated, licensing may be handled by other applications, such as the media player within the electronic equipment, for example.

FIG. 4 illustrates a flow chart that provides exemplary steps that may be performed in a media sharing session. Beginning at block 62, user A creates a play list comprising different media content. The play list may include a single media type (e.g., all music, all video, an audio book, etc.), or it may include intermixed media content (e.g., a song followed by a picture and then by a video). Once the play list is created, user A may execute the media content 12 on his device as specified in the play list.

At block 64, it is determined if auto sharing is enabled on user A's device. Auto sharing indicates whether or not user A is willing to share his media content with other users. If auto sharing is not enabled, then user A's session may not be detected by other devices, and the method ends. If auto sharing is enabled, however, then user A's session may be detected and joined by other devices.

In enabling auto sharing, user A may put restrictions on who may join his session. For example, user A may allow sharing only among friends, which may be accomplished via a password, identification number, or the like. Further, restrictions may be based on the communication protocol itself (e.g., based on accessibility limitations in Bluetooth protocol, such as limiting who may connect). If the user wishing to join the session knows the password, the user's identification number is part of a pre-approved list of numbers, or the mobile phone wishing to connect is approved in the communication protocol itself, then the user may join the session. If not, then the user cannot join the session. The identification number and/or password may be stored in memory of the respective devices, for example.

At block 66, user B decides he wants to join a session, and clicks on a join session button on his device. The button may be a dedicated button, or it may be a soft (e.g. display) button provided on the device's display interface. User B's device then searches the surrounding wireless network for listening UPnP services that support the media sharing service, as indicated at block 68. At block 70, user A's device responds and identifies itself and its session to user B's device. User B's device sees user A's session, and joins the session, as indicated at block 72. In other words, user B's device and user A's device establish a communication link between one another.

At block 74, user B's device pulls the session data 14 from user A's device. The session data 14, which can be a play list, a library, a location identifier for media content, etc., includes information regarding media content currently executing or that can be queued to execute on user A's device. In its simplest form, the session data 14 is an ordered listing of media content that can be executed on user A's device. The listing can include audio, video, images, text, or any other means for providing an experience to the user.

Once the session data 14 is transferred to user B's device, user B's device determines if the media content 12 specified in the session data is located on user B's device, as indicated at block 76. If the media content is on user B's device, then it may be executed immediately, as indicated at block 82. If it is not on user B's device, then at block 78 user B's device searches for the media content 12 and downloads it to user B's device. The search may include user A's device, other devices in the general vicinity (e.g., other mobile phones, lap top computer, mp3 players, etc.), or access the internet (e.g., via a WIFI connection).

As the media content 12 is located, user B's device downloads the media content into memory. If the media content is copyrighted, then at block 80 DRM rights can be obtained before the media content may be executed. For example, user B may be provided with a message that the media content is copyrighted material, and then given the choice of accessing a pay site to pay for the media content license, as is conventional.

Preferably, user B's device begins to execute the media content as specified in the session data 14 and shown at block 82, even before all of the media content has been transferred. In this manner, user B can enjoy the media content 12 with very minimal or no delay. Downloading of media content 12 can progress in the background as user B's device begins to execute the media content 12 as specified from the session data 14.

Figure 5:
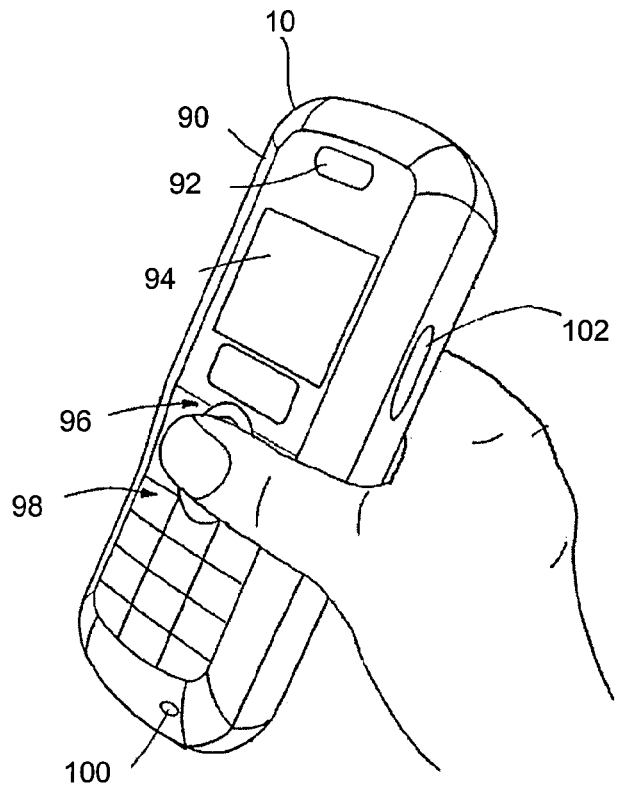
FIG. 5 is schematic illustration of an exemplary mobile phone.

Referring now to FIG. 5, an exemplary mobile phone 10 is shown that may be used in conjunction with the invention. The mobile phone 10 is shown as having a "brick" or "block" design type housing 90, but it will be appreciated that other type housings, such as, for example, clam shell or slide-type housings, may be utilized without departing from the scope of the invention. The mobile phone 10 includes housing 90 (sometimes referred to as a case), speaker 92, display 94, navigation switch and selection/function keys or switches 96, key pad 98, microphone 100, and volume control slide switch 102; these are illustrative and exemplary of parts of a typical mobile phone, but it will be appreciated that other parts that are similar or different in form and/or function may be included in the mobile phone 10. The mobile phones to which the invention pertains also may be of the types that have more or fewer functions, keys, etc., compared to those illustrated and described herein.

Figure 6:
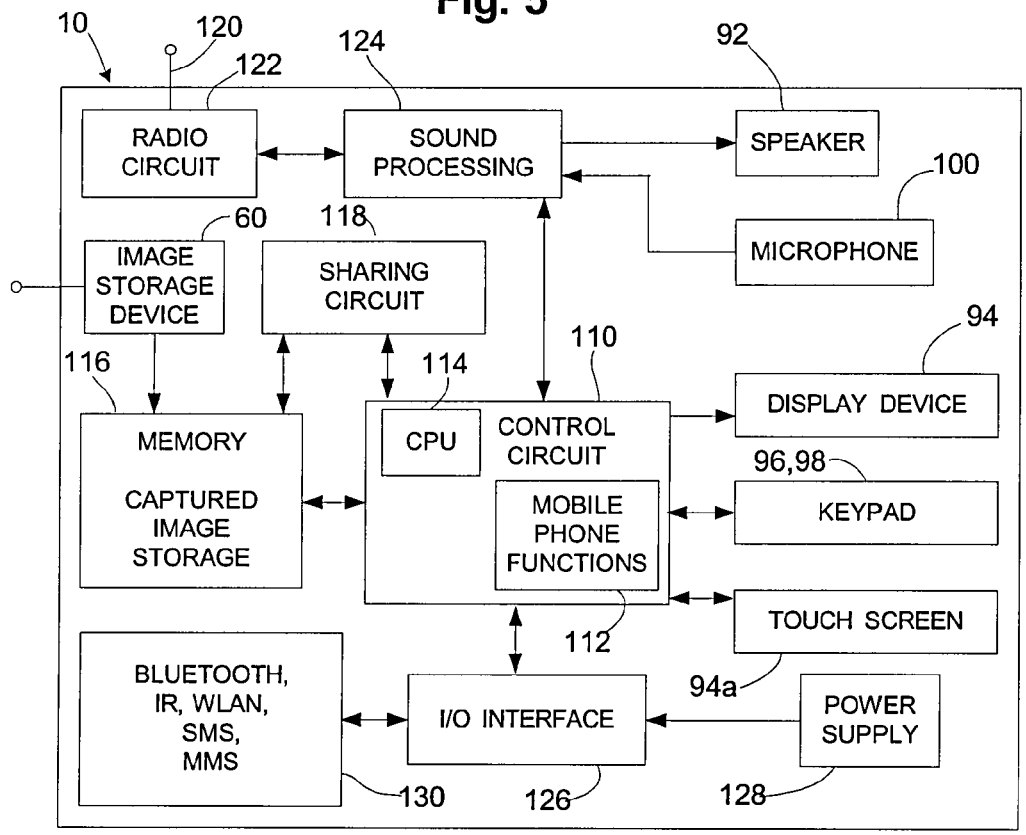
FIG. 6 is a schematic block diagram of a number of exemplary relevant portions of the respective mobile phone of FIG. 5 in accordance with the present invention.

As will be appreciated, the mobile phone 10 may function as a conventional mobile phone. The mobile phone 10 may have additional functions and capabilities that may be developed in the future. From a conventional point of view, the display 94 displays information to a user, such as operating state, time, phone numbers, contact information, various navigational menus, etc., which facilitate and/or enable the user to utilize the various features of the mobile phone. The display also may be used to view movies, images, or to play games, for example. Part or all of the display 94 may be a touch screen type device 94*a* (FIG. 6). The navigation and function keys 96 and the keypad 98 may be conventional in that they provide for a variety of user operations. For example, one or more of the navigation and function keys 96 may be used to navigate through a menu displayed on the display 94 to select different phone functions, profiles, settings, etc., as is conventional. The keypad 98 typically includes one or more special function keys, such as, a "call send" key for initiating or answering a call, a "call end" key for ending or hanging up a call, and dialing keys for dialing a telephone number. Other keys included in the navigation and function keys 96 and/or keypad 98 may include an on/off power key, a web browser launch key, a camera key, a voice mail key, a calendar key, etc. The volume control switch 102 may be operated to increase or to decrease the volume of the sound output from the speaker 92. If desired, a sensitivity control also may be provided to change the sensitivity of the microphone 100 as it picks up sounds for transmission by the mobile phone 10. The mobile phone 10 may have more of fewer keys, navigation devices, etc., compared to those illustrated.

FIG. 6 represents a functional block diagram of an exemplary mobile phone, for example, the mobile phone 10. The representation also is similar to those of PDAs and/or other electronic equipment, as will be appreciated by those having ordinary skill in the art. The construction of the mobile phone 10, which is presented by way of example here, is generally conventional with the exception of the circuits associated with sharing media content, as described in greater detail below. The various functions carried out by the parts represented in the functional block diagram of FIG. 6 may be carried out by application software within the mobile phone 10. However, it will be apparent to those having ordinary skill in the art that such operation can be carried out via primarily software, hardware, firmware, or a combination thereof, without departing from the scope of the invention.

The mobile phone 10 includes a primary control circuit 110 that is configured to carry out overall control of the functions and operations of the mobile phone 10, e.g., as is represented at block 112. The control circuit 110 may include a CPU 114 (central processor unit), microcontroller, microprocessor, etc., collectively referred to herein simply as CPU 114. The CPU 114 executes code stored in memory (not shown) within the control circuit 114 and/or in a separate memory 116 in order to carry out conventional operation of the mobile phone functions within the mobile phone 10. In addition, a sharing circuit 118, coordinates sharing of media content, including establishing sessions and downloading or uploading media content, as described herein. The sharing circuit may be implemented in hardware, software, firmware, or a combination thereof.

Continuing to refer to FIG. 6, the mobile phone 10 includes a conventional antenna 120, radio circuit 122, and sound processing signal circuit 124, all of which are cooperative to send and to receive radio frequency (or other) signals in conventional manner. For an incoming signal, for example, the sound processing signal circuit 124 may include an amplifier to amplify the signal and to provide it to the speaker 92 so a user may hear the sound, and the sound processing signal circuit 124 also may use the same amplifier or another amplifier to amplify signals from the microphone 100 for transmitting thereof via the radio circuit 122 and antenna 120 to another mobile telephone, to a cellular phone tower, to a satellite, etc. Operation of the radio circuit 122, sound processing signal circuit 124, speaker 92 and microphone 100, are under control of the control circuit 110, as is conventional.

The mobile phone 10 includes the display device 94, keypad 96, 98 (including the navigation device mentioned above), and the capability of a touch screen 94a, which may be part or all of the display device 94, and these are coupled to the control circuit 110 for operation as is conventional.

As is illustrated in FIG. 6, the mobile phone 10 includes an input/output interface 126, a power supply 128, and a short distance communications mechanism 130, for example a Bluetooth communications device, infrared (IR) communications device, or some other device. Another example of a short distance communications mechanism is wireless local area network (WLAN), and the invention also may use still other short distance communications mechanisms or devices that currently exist or may be developed in the future. The short distance communications mechanism 130 may transmit and receive signals using SMS (short message service), MMS (multimedia messaging service) or some other communications mechanism and protocol. Bluetooth, IR, WLAN communications for communicating over short distances between mobile phones are well known; other mechanisms may exist and/or may be developed in the future, and these may be utilized by and are included for use in the invention.

Figure 7:
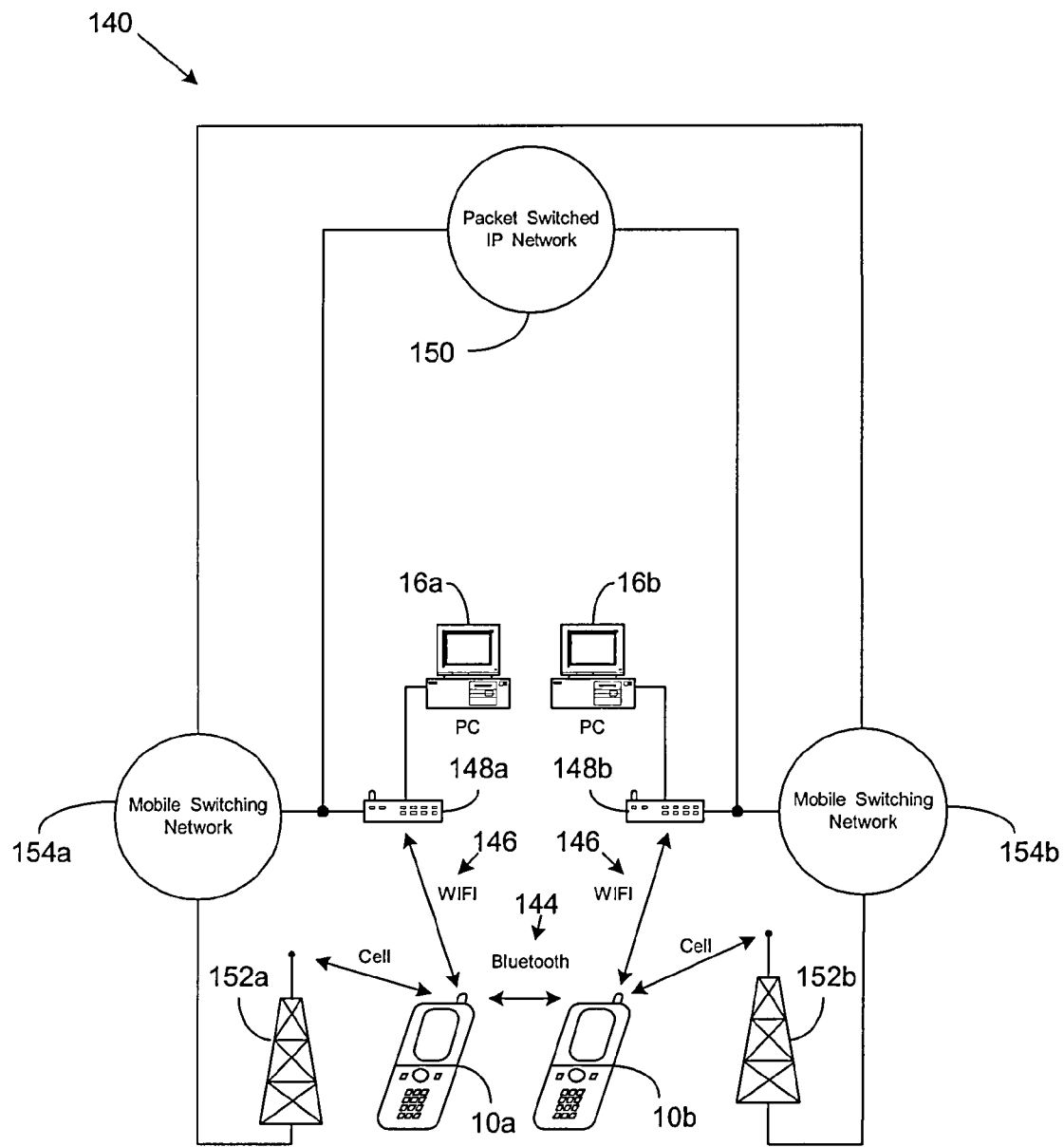
FIG. 7 is a schematic diagram illustrating exemplary communication links for a mobile phone.

Referring now to FIG. 7, there is shown an exemplary diagram 140 illustrating various communication mediums 142 that can be used for electronic equipment embodied as mobile phones. A first and second mobile phone 10a and 10b can transfer data via a number of different conduits. For example, media content can be directly transferred between the respective phones using a Bluetooth communication link 144. Alternatively, media content can be transferred from the first cellular phone 10a to a first PC 16a, a second PC 16b and/or the second mobile phone 10b, and vice-versa, via a WIFI connection 146 using a wireless router 148a and 148b and/or a packet switched IP network 150 (e.g., the internet, a local area network, a wide area network, etc.). Additionally, media content may be transferred from the first mobile phone 10a to the first PC 16a, the second PC 16b or the second cellular phone 10b, and vice-versa, via a cellular communication link using cellular towers 152a and 152b and mobile switching networks 154a and 154b. As will be appreciated, a number of other connections may be established that are not shown in FIG. 7. For example, a Bluetooth communication link may be established between the mobile phones 10a and 10b and the PCs 16a and 16b.

A person having ordinary skill in the art of computer programming and applications of programming for mobile phones would be able in view of the description provided herein to program a mobile phone 10 to operate and to carry out the functions described herein. Accordingly, details as to the specific programming code have been omitted for the sake of brevity. Also, while software in the memory 116 or in some other memory of the mobile phone 10 may be used to allow the mobile phone to carry out the functions and features described herein in accordance with the preferred embodiment of the invention, such functions and features also could be carried out via dedicated hardware, firmware, software, or combinations thereof, without departing from the scope of the invention.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of transferring a media session from a first electronic equipment to a second electronic equipment, comprising:
    playing on the first electronic equipment media content specified by session data corresponding to the media session, the first electronic equipment being a mobile device;
    the first electronic equipment detecting the second electronic equipment;
    the first electronic equipment pushing the media session to the second electronic equipment, wherein pushing includes the first electronic equipment transferring the session data to the second electronic equipment, the session data including information concerning the media content currently being played on the first electronic equipment and a present location within the media content at which the first electronic equipment is playing the media content; and
    subsequent to transfer of the session data to the second electronic equipment the second electronic equipment
    i) searching for the media content specified in the session data on a remote source,
    ii) initiating reception of the media content streamed from the remote source, and
    iii) initiating play of the media content based on the present location specified by the session data.

2. The method of claim 1, wherein the session data comprises a list of information for identifying media contents playing or playable on at least one of the first or second electronic equipment.

3. The method of claim 1, wherein the media content comprises a video content.

4. The method of claim 1, wherein pushing the media session includes transferring the media content from the first electronic equipment to the second electronic equipment.

5. The method of claim 1, wherein pushing the media session includes transferring the media content from a streaming server to the second electronic equipment.

6. The method of claim 1, wherein pushing the media session includes automatically identifying a secondary source for the media content when a communication link between the first electronic equipment and the second electronic equipment is terminated.

7. The method of claim 1, further comprising playing the media content on the second electronic equipment.

8. The method of claim 1, wherein pushing the media session includes transferring the media content from a plurality of electronic equipments to the second electronic equipment.

9. The method of claim 1, wherein the session data comprises a queue for identifying media contents playing or playable on the first electronic equipment or the second electronic equipment.

10. The method of claim 1, wherein the second electronic equipment is to be used for a television system.

11. The method according to claim 1, wherein the second electronic equipment comprises a game system.

12. The method of claim 1, further comprising the first electronic equipment discovering that the second electronic equipment is one in which the session can be pushed.

13. The method of claim 12, wherein the detecting includes searching for the second electronic equipment in a vicinity of the first electronic equipment.

14. The method of claim 13, wherein the detecting includes detecting the presence and capabilities of the second electronic equipment.

15. The method of claim 1, further comprising using a layered interaction between at least two of a session service, a sharing service, a download service, a file system service and a content service to transfer of the media session.

16. An electronic equipment for playing media content, comprising:
    a communication circuit for communicating with a mobile electronic equipment; and
    a processing circuit communicatively coupled to the communication circuit, the processing circuit configured to:
        receive, via the communication circuit, a media session pushed from the mobile electronic equipment to the electronic equipment, wherein the media session comprises session data that includes information concerning media content currently being played on the mobile electronic equipment and a present location within the media content at which the mobile electronic equipment is playing the media content;
        search for the media content on a remote source;
        initiate reception of the media content streamed from the remote source to the second electronic equipment; and
        initiate play of the media content based on the present location specified by the session data.

17. The electronic equipment of claim 16, wherein the electronic equipment comprises a game system.

18. A mobile electronic equipment for playing media content, comprising:
    a communication circuit for communicating with another electronic equipment; and
    a processing circuit communicatively coupled to the communication circuit, the processing circuit configured to:
        play media content specified by session data of a media session;
        detect the another electronic equipment; and
        push, via the communication circuit, the media session to the another electronic equipment, the media session comprising session data corresponding to the media session being executed on the electronic equipment and including information concerning media content currently being played on the electronic equipment and a present location within the media content at which the electronic equipment is playing the media content.

19. The mobile electronic equipment according to claim 18, further comprising a session service configured to discover if a push session can be performed with the another electronic device.

20. The mobile electronic equipment of claim 18, wherein the session service is configured to detect the presence and capabilities of the second electronic equipment.

21. The mobile electronic equipment according to claim 18, further comprising at least two of a session service, a sharing service, a download service, a file system service and a content service,
   wherein the mobile electronic equipment is configured to transfer the media session using a layered interaction between the at least two services.

* * * * *